United States Patent [19]
Yazawa

[11] 3,853,448
[45] Dec. 10, 1974

[54] APPARATUS FOR SHAPING AN ORIENTED TUBULAR FILM BY WET PROCESS

[75] Inventor: Masahide Yazawa, Higashi, Japan

[73] Assignee: Polymer Processing Research Institute Ltd., Tokyo, Japan

[22] Filed: Aug. 22, 1972

[21] Appl. No.: 282,798

[30] Foreign Application Priority Data
Sept. 23, 1971 Japan.............................. 46-74426

[52] U.S. Cl. ............................ 425/326 R, 425/388
[51] Int. Cl. ........................... B29d 7/20, B29d 7/24
[58] Field of Search.......... 425/326, 326 B, 71, 388, 425/DIG. 53, DIG. 60; 264/95, 209, 237, 210 R

[56] References Cited
UNITED STATES PATENTS

| | | | |
|---|---|---|---|
| 3,363,035 | 1/1968 | Niiho et al............................ | 264/89 |
| 3,600,488 | 8/1971 | Yazawa................................. | 264/95 |
| 3,663,134 | 5/1972 | Coquelin............................... | 425/72 |

Primary Examiner—Francis S. Husar
Assistant Examiner—David B. Smith
Attorney, Agent, or Firm—Fred Philpitt

[57] ABSTRACT

An oriented tubular film of a polymer is shaped by downwardly blowing wet method by an apparatus comprising: a hollow cylinder having an annular feed vessel for coagulation liquid at the top thereof, provided through the top wall of a sufficiently spacious negative pressure chamber capable of accommodating therein undermentioned successive means down to a flattening and withdrawing pinching means, the upper part of the hollow cylinder projecting out from the negative pressure chamber having heating means from outside thereof and inner grooved wall surface, and the lower part of said hollow cylinder extending into said chamber, consisting of perforated wall; downwardly spread conical guide wall; feeding means for supplemental heating liquid; an annular trough for collecting and separating heating liquid from inflated tubular film; cooling liquid tube; flattening and withdrawing means at the bottom of said chamber; negative pressure sealing means for withdrawing flattened tubular film; and outside withdrawing means of the flattened tubular film in the atmosphere.

8 Claims, 2 Drawing Figures

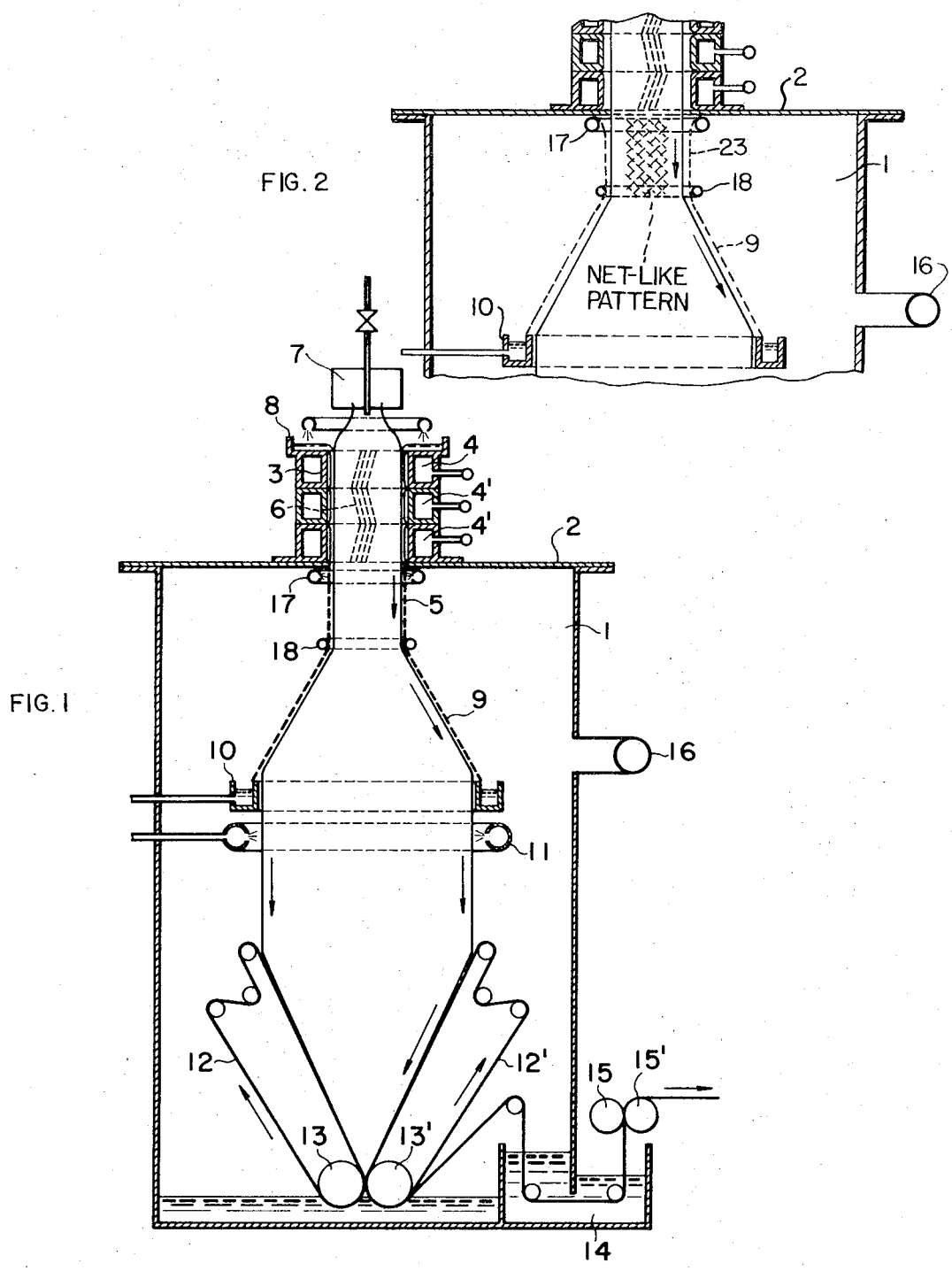

APPARATUS FOR SHAPING AN ORIENTED TUBULAR FILM BY WET PROCESS

DESCRIPTION OF THE INVENTION

This invention relates to an apparatus for shaping an oriented tubular film by inflation by wet process, and more particularly to an apparatus for the process which comprises: extruding a tubular polymer mass vertically downwards; allowing the outer circumference of the polymer mass to come in contact with a liquid which is preferably colder than the temperature of the extruded tubular polymer mass and flows down along the upper part of a grooved inside wall surface of a hollow cylinder thereby to solidify or coagulate (hereinafter, the working, to solidify and coagulate or solidification and coagulation, are merely denoted as to coagulate or coagulation, respectivelY) a tubular film; heating the circum-enveloping, peripherally flowing-down liquid at the lower part of grooved wall to reheat the tubular polymer mass and subjecting the mass to rub-sliding by the inside surface of a perforated hollow cylinder provided in a negative pressure chamber and connected to the grooved hollow cylinder; supplementing the heated liquid in the negative pressure chamber and allowing the liquid to flow down, thereby reheating the surface layer of the tubular film and keeping the coagulated tubular film in the thickness direction within an adequate temperature range for stretching; supporting the film along the inside surface of the perforated wall in the negative pressure chamber by suction and rub-sliding; inflating the tubular film along a conical, umbrella-like wall connected to the lower end of the hollow cylinder in the negative pressure chamber by a negative pressure; then cooling and flattening the film; and withdrawing to the atmosphere through pinch rollers at the lower part of the said chamber and a negative pressure-sealing device at the sidewall of the negative pressure chamber. That is to say, the present invention relates to an apparatus for shaping a tubular film having a good molecular orientation by wet process comprising: shaping a tubular film by coagulation; successively reheating the outer peripheral part of a tubular film once too much cooled or coagulated by cooling or the like in the course of coagulation to an adequate temperature suitable for stretching by which molecular orientation can be improved, so that the temperature of the outer peripheral part of the film may become as close as possible to that of the inner peripheral part of the film and so that the molecular orientation may become as uniform as possible throughout in the thickness direction of the film, by means of a circum-enveloping and peripherally flowing-down coagulation liquid heated from the outside wall; supplementing a heated liquor in the negative pressure chamber to keep the film at an adequate temperature for stretching; stretching the tubular film to a desired diameter by inflation by a pressure exerted by the difference between inside shaping pressure of the tubular film and negative pressure in the negative pressure chamber; and then cooling the stretched film.

The apparatus of the present invention is characterized in: a hollow cylinder having at the top thereof, a feed vessel for coagulation liquid, provided sufficiently below and concentrically to an annular die from which the tubular mass is extruded and penetratingly and vertically through the top wall of a sufficiently spacious negative pressure chamber capable of accommodating therein successive means down to a flattening and withdrawing pinching means, the upper part of the hollow cylinder projecting out from the negative pressure chamber, having heating means from outside thereof and grooved inner wall surface, and the lower part of the hollow cylinder extending into the negative pressure chamber, consisting of a perforated wall through which negative pressure outside the wall and in the negative pressure chamber can suck and press the film thereto to support the film while passing therethrough; downwardly spread, conical umbrella-like guide wall of the inflating film attached to the lower end of the perforated hollow cylinder; supply means for supplemental heated liquid to perforated wall and umbrella-like guide wall; an annular trough surrounding the lower end of the umbrella-like guide wall; cooling means for inflated tubular film from outside in the negative pressure chamber; and outside withdrawing means for flattened oriented tubular film, so as to realize the following points:

1. A tubular film is passed downwards in contact with the inside wall of a hollow cylinder provided through the top wall of a negative pressure chamber, and the tubular film is at first cooled or coagulated by contacting with a coagulation liquid and guided into the negative pressure chamber while sliding along the inside surface of the grooved wall of the hollow cylinder and successively through a perforated hollow cylinder connected to the lower end of the grooved hollow cylinder in the negative pressure chamber and the film is rubbed and slided along the inside surface of a perforated wall of the hollow cylinder in the negative pressure chamber by suction, whereby the tubular film above the upper end of the perforated wall can be supported by the resulting rub-sliding friction and the stretching tension applied from the downward side in the longitudinal direction is prevented from extending to the die side.

2. An aqueous solution having a large specific heat and readily keepable substantially at a constant temperature at the time of cooling or heating can be advantageously used.

3. A coagulation liquid which flows down along the outer surface of the tubular film while circum-enveloping the film, has at first an adequate and preferably colder temperature than that of the extruded tubular polymer mass for coagulation, and the outer periphery of the tubular film once cooled to solidify or coagulated from the outside at the upper part of the grooved hollow cylinder is reheated to an adequately high temperature for stretching to improve molecular orientation, which is usually and considerably lower than the temperature of the just extruded polymer mass, by a circum-enveloping and peripherally flowing-down liquid heated from outside at the lower part of the grooved hollow cylinder and also by supplemented heated liquid, whereby a stretching by inflation is possible under a relatively low negative pressure of 80 – 150 mm H$_2$O column.

4. At the top part of the negative pressure chamber, negative pressure is sealed by a circum-enveloping and peripherally flowing-down liquid through the gap between the tubular film and grooved hollow cylinder, and the negative pressure sealing at the outlet of the tubular film is effected by a liquid vessel-type negative pressure seal after the tubular film is flattened, or a slit provided at the side wall of the negative pressure chamber.

5. A sufficiently larger space is given to the negative pressure chamber capable of providing withdrawing pinch rollers in the negative pressure chamber and enables operators to work in the negative pressure chamber for inspection.

When a shaped film having an adequate temperature for stretching of 115°–130°C, such as films of polyethylene, polypropylene, polystyrene, etc., is applied to the present apparatus, a concentrated ammonium nitrate solution is used as a cooling or heating medium. In the case of the films being obtained by quenching molten polymer and having an adequate temperature for stretching of about 80° to 100°C, such as films of nylon, polyester, polypropylene, polyvinyl chloride, polyvinylidene chloride, etc. or in the case of the films being obtained by wet process shaping and having an adequate temperature for stretching of 80° to 100°C, such as acrylonitrile film, water or a liquid mixture of water and a polymer solvent, is used as a cooling or heating medium. In the case of the tubular films obtained from a concentrated polyvinyl alcohol solution by a wet process using an ammonium sulfate coagulation liquid, a concentrated ammonium sulfate solution is used for heating or cooling.

Advantages obtained particularly when a salt solution is used are as follows: Since a boiling point is made definite by making a salt concentration constant, there is no overheating of the tubular film. Even if there occurs overheating partially, the coagulation solution boils at that part, and only vapors are evolved towards the negative pressure chamber side, and the overheating of the film at that part can be prevented. Therefore, uniform heating of the total circumference of the tubular film can be effected readily.

FIG. 1 shows a cross-section of the present apparatus. FIG. 2 is a fragmentary portion of FIG. 1 showing another embodiment of the invention.

A hollow cylinder is provided sufficiently below and concentrically to the annular slit of a die from which the tubular film mass is extruded, and vertically and penetratingly through the top wall 2 of negative pressure chamber 1, and an upper part of hollow cylinder wall 3 has jackets 4 and 4' for supplying pressure steam or electrothermical heating means on the outside. When jackets 4 and 4' are heated so that the upper jacket in the heating part of said cylinder may be heated with a high temperature steam and the lower jacket may be heated with a steam having nearly an adequate temperature for stretching, the length of heating wall can be shortened. A lower part of the hollow cylinder extending into the negative pressure chamber consists of perforated wall 5, and a plurality of slanted grooves 6 are provided at least on the inside wall surface of said upper part 3 projecting out from the negative pressure chamber and having heating means, to allow a coagulating solution to flow down even if the tubular film is passed through the hollow cylinder in contact with the inside wall surface thereof. The grooves are so shaped and arranged that a coagulation liquid can flow down in an amount of 10 to 15 times the amount of the tubular film passing therethrough. A tubular mass of polymer extruded from annular die 7 provided concentrically above the hollow cylinder is made to move downward and to contact with the inside wall surface of the hollow cylinder, and at that tim, a coagulation liquid having an time, temperature for coagulation is supplied to annular feed vessel 8 provided at the top end of the hollow cylinder, and the coagulation liquid flows down while circum-enveloping the tubular mass and effecting a negative pressure sealing, whereby a tubular film is shaped at first. The flowing-down coagulation liquid is heated by supplying steam to jackets 4 and 4' or by an electric heater provided at the outer wall of the hollow cylinder below the annular feed vessel. The heated, flowing-down liquid, and another supplemental heated liquid supplied from annular piping 17 onto the outer periphery of perforated hollow cylinder 5 at the top end of the negative pressure chamber, reheat the too much cooled surface of tubular film to an adequate temperature for stretching. The tubular film is made to move downward along perforated wall 5 of the hollow cylinder within the negative pressure chamber while being rub-slided by suction due to the negative pressure applied from the outside. Therefore, the tubular film above the end part of the perforated wall is supported constantly by the resulting rub-sliding friction and moves downward, whereby a stretching tension applied from the downward side in a longitudinal direction can be prevented from extending to the upper die side. The perforated wall can be of double perforated wall structure, if necessary, and when the outer perforated wall is made to rotate around the inner one, overlapping of perforations on both inner and outer walls can be adjusted. That is, a cross-sectional area of perforations towards the outside (negative pressure side) can be adjusted, and a force to suck the tubular film to the perforated wall, that is, a rub-sliding force by the suction can be adjusted. Therefore, an influence of a tension applied to the upward portion of the tubular film from the downward side can be readily controlled by such a double perforated wall structure.

A downwardly spread conical or umbrella-like perforated wall 9 is connected to the lower end of said hollow cylinder, and a plurality of grooves can be provided on the upper side of the umbrella-like wall to make a hot solution serving to keep the tubular film warm to flow uniformly along the upper side of the umbrella-like wall. At the same time, the perforations can be properly arranged to make the solution uniformly flow downward and keep the temperature at the wall surface constant. To the tubular film is applied, in most cases, an inner pressure of usually 5 to 10 mm water column when the film is shaped. The tubular film moving downward along the umbrella-like wall part is inflated and guided in contact with the umbrella-like wall by a pressure exerted by a sum total of the inside pressure and outer negative pressure. Since the tubular film is already heated substantially uniformly in the thickness direction to an adequate temperature for stretching and is in a gellated or softened state, the molecular orientation due to the post-stretching effect is advantageously carried out almost equally in the direction of thickness of the tubular film through inflation. Therefore, a far better molecular orientation can be attained in the entire thickness of the film and a product having a good strength can be obtained in the present invention, as compared with the conventional well-known method based on effecting the molecular orientation with an increased inflation ratio, while extensively air-cooling the tubular mass of polymer leaving the die. According to the air-cooling inflation shaping method, the molecular orientation is improved only at the outer skin portion of the tubular film where the temperature thereof becomes a suitable temperature for after-stretching, because the inside portion undergoes inflation when the temperature thereof is too high and the coagulation is still insufficient due to insufficient cooling effected there, and consequently the molecular orientation cannot be improved so as to be uniform throughout in the thickness direction of the film.

The hot solution flowing down along the umbrella-like wall is collected into annular trough 10 provided at the lower end of the wall, and separated from the inflated tubular film. The separated solution is subjected to temperature adjustment, and can be again used by recycling to annular feed vessel 8 provided at the upper end of the hollow cylinder. The inflated tubular film is cooled by a cold solution injected through annular tube 11 surrounding the outer circumference of the tubular film just after the hot solution is separated. Then, the tubular film is flattened to a double sheet through flattening devices 12 and 12' such as circulating belts or guide plates, and is passed through between pinch rollers 13 and 13' provided at the lower bottom part of the negative pressure chamber. Then, the tubular film is withdrawn into the atmosphere through a negative pressure sealing device, for example, liquid vessel-type negative pressure sealing device 14 communicating between the negative pressure chamber and the atmosphere, and outside withdrawing pinch rollers 15 and 15'. A liquid level in device 14 is higher in the negative pressure chamber only by a level corresponding to a lower pressure in the negative pressure than that in the atmosphere.

The negative pressure chamber is kept under a constant pressure by means of negative pressure pipe 16. Further, as a pressure sealing device for withdrawing the flattened film to the outside of the negative pressure chamber, a slit for negative pressure sealing can be provided at the side wall of the negative pressure chamber, not shown in the drawings, in place of the liquid vessel-type negative pressure sealing device as shown in the drawing, and an elastomer tube of small thickness in a flattened state is connected along the slit, whereby the negative pressure sealing can be practically readily attained.

In place of rigid perforated wall 5 at the lower part of the hollow cylinder in the drawing, a hyperboloidal shaped tubular net of flexible fibers having a definite number of meshes around the entire net 23 as shown in FIG. 2 and provided with downwardly pulling means 18 can be used, and the hyperboloidal shape net in contact with the tubular film is deformed into a cylindrical one, and by adjustment of the downward tension of the net, an adequate throttling friction can be given to the passing tubular film. In that case, the rub-sliding friction of the tubular film can be increased by the throttling friction over the case where only the suction due to the negative pressure is applied thereto. In such a structure, an effect of preventing the stretching tension applied from the downward side from extending towards the upward die side can be made more remarkable. Further, the successive umbrella-like perforated outer wall may be of rigid body or a flexible wall of fiber net. In the latter case, the wall is deformed to an almost hemi-spherical shape according to the cross-section of an inflating balloon of the tubular film. The solution flowing down along the net-like perforated wall is thoroughly stirred and the net-like perforated wall serves to prevent a falling stream from flowing non-uniformly on the film surface. Since the cooling solution is accumulated at the bottom of the negative pressure chamber, the accumulated solution can be used by recycling by a pump after cooling in a coil, when a salt solution is used, though not shown in the drawing.

The oriented film obtained according to the present invention is in a tubular form, and therefore the present invention is suitable for the production of a tubular film for shrink-package, depending upon the kind of polymer.

Stretching ratio of a film for shrink-package is represented by longitudinal stretching ratio $x$ lateral stretching ratio = area stretching ratio and a sufficiently practical product can be obtained by a stretching of a few times at an adequate temperature for stretching. Highly oriented tubular film having a good strength can be obtained in a high area stretching ratio. To obtain an oriented film of particularly large thickness, a chemical solution having an adhesive effect is sealed into the inside of the tubular film above pinch rollers 13 and 13', and the tubular film is bonded under pressure when pinched.

What is claimed is:

1. An apparatus for shaping an oriented tubular film by downwards blowing wet process, which comprises: a hollow cylinder having an annular feed vessel for coagulation liquid at the top thereof, provided sufficiently below and concentrically to an annular die from which a tubular polymer mass is extruded penetratingly and vertically through the top wall of a sufficiently spacious negative pressure chamber capable of accommodating therein hereinafter-mentioned successive means down to a flattening and withdrawing pinching means, the upper part of the hollow cylinder, projecting out from the negative pressure chamber, having heating means from outside thereof and grooved inner wall surface, and the lower part of said hollow cylinder, extending into the negative pressure chamber, consisting of a perforated wall through which negative pressure outside the wall and in the negative pressure chamber can suck and press the film thereto, to support the film while passing therethrough; a downwardly spread, conical umbrella-like guide wall for the inflating tubular film, attached to the lower end of the perforated hollow cylinder; supply means for supplemental heated liquid to the perforated wall and the umbrella-like guide wall; an annular trough with drainage means to collect the flowing down liquid and separate the heating liquid from the inflated tubular film at the lower end of said guide wall; an annular coagulating liquid tube provided below the trough to inject a coagulation liquid to the tubular film; a flattening and withdrawing means of the tubular film provided at the bottom of the negative pressure chamber; and a negative pressure sealing means provided at the side bottom of the negative pressure chamber together with outside withdrawing means to withdraw the flattened tubular film into the atmosphere.

2. An apparatus according to claim 1, wherein the perforated wall of the hollow cylinder is of a rigid body.

3. An apparatus according to claim 2, wherein the perforated wall of the hollow cylinder is of double perforated wall structure, the outer wall being rotatable around the inner one to adjust the opening of perforation.

4. An apparatus according to claim 1 wherein the perforated wall of the hollow cylinder is a hyperboloidal shape tubular net of flexible fibers having a definite number of meshes around the net and means to exert downward tension thereto.

5. An apparatus according to claim 1, wherein the umbrella-like wall is of a rigid body.

6. An apparatus according to claim 5, wherein the umbrella-like wall is provided with a plurality of grooves on the upper side of the wall to make a hot solution serving to keep the tubular film warm to flow uniformly along the upper side of the wall.

7. An apparatus according to claim 1, wherein the umbrella-like wall is a flexible wall of fiber net.

8. An apparatus according to claim 1, wherein the negative pressure chamber sealing device is a liquid vessel-type sealing device.

* * * * *